No. 842,221. PATENTED JAN. 29, 1907.
F. N. MARTIN.
SNOW SHOVEL ATTACHMENT FOR PITCHFORKS.
APPLICATION FILED MAY 4, 1906.

Witnesses.
Ina Graham
Nora Graham

Inventor,
Fenton N. Martin.
by L. P. Graham
his attorney.

UNITED STATES PATENT OFFICE.

FENTON N. MARTIN, OF VIRDEN, ILLINOIS.

SNOW-SHOVEL ATTACHMENT FOR PITCHFORKS.

No. 842,221.      Specification of Letters Patent.      Patented Jan. 29, 1907.

Application filed May 4, 1906. Serial No. 315,260.

*To all whom it may concern:*

Be it known that I, FENTON N. MARTIN, a resident of Virden, in the county of Macoupin and State of Illinois, have invented a certain new and useful Snow-Shovel Attachment for Pitchforks, of which the following is a specification.

The object of my invention is to provide for readily converting a pitchfork into a snow-shovel without the use of tools and without in any way changing the fork.

The invention is exemplified in the structure hereinafter described, and it is defined in the appended claims.

Figure 1:
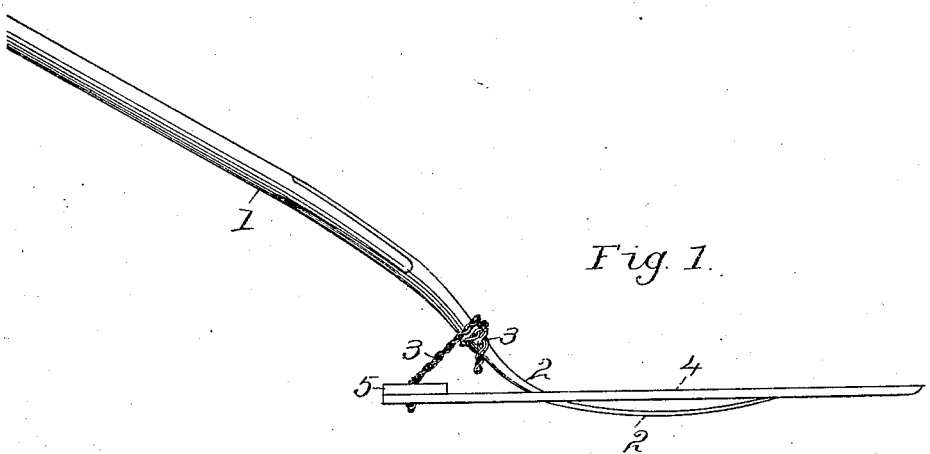
Figure 2:
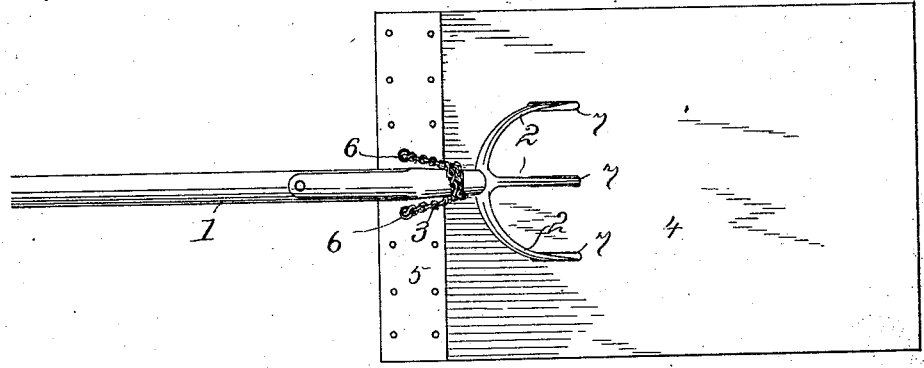

In the drawings forming part of this specification, Figure 1 is a side elevation of a pitchfork and shovel-board conjoined in accordance with my invention, and Fig. 2 is a plan of the conjoined structure.

The handle of the fork is shown at 1 and the tines thereof at 2. A three-tined fork is shown; but it is obvious that a fork having any other plurality of tines may be used as well.

The board 4 constitutes the snow-shovel, and it has a cleat 5, through which and the board holes 6 are formed, and it also has a plurality of slots 7, corresponding in number and intervening spaces with the tines of the fork to which it is to be attached. The slots 7 extend parallel of the sides or edges of the board, and they are located in about the shown position with relation to cleat 6. A securing-hitch 3 extends obliquely from the cleat to the lower end of the handle of the fork, and the hitch or tie is preferably a chain, as shown, although not necessarily so. The chain is passed through the holes 6 of the shovel-board, and its ends are wound around the handle and secured thereto.

In attaching the shovel to the fork the tines of the fork are inserted through the slots, the handle is pressed downward or toward the cleat end of the shovel until the tie or hitch is suitably tightened and secured, and the elasticity of the tines aids the tie in making the connection secure and stable after the pressure on the handle is released.

I do not confine the shovel to the comparative size and proportion shown, and changes in details not inconsistent with the terms of the following claims may be made without departing from the spirit of the invention.

What I claim as new, and desire to secure by Letters Patent, is—

1. In a snow-shovel, the combination of a shovel-board having slots between its ends, cut through the board, a pitchfork having curved tines inserted through the slots of the board, from the back to the front of the board, and a connection between the rear end of the board and the handle of the fork.

2. In a snow-shovel, the combination of a pitchfork having curved tines, a shovel-board having slots between its ends through which the tines of the fork are inserted and also having a cleat across its rear end, and a connection between the rear end of the board and the handle extending obliquely with relation to the board and at approximately right angles with the handle.

In testimony of which I sign my name in the presence of two subscribing witnesses.

F. N. MARTIN.

Witnesses:
  B. F. WORKMAN,
  JOHN WATSON.